(12) United States Patent
Petersen

(10) Patent No.: US 9,254,889 B2
(45) Date of Patent: Feb. 9, 2016

(54) VEHICLE SPROCKET CHAIN MAINTENANCE APPARATUS AND A METHOD OF USING THE SPROCKET CHAIN MAINTENANCE APPARATUS

(76) Inventor: Sonny Petersen, Ølsted (DK)

( * ) Notice: Subject to any disclaimer, the term of this patent is extended or adjusted under 35 U.S.C. 154(b) by 972 days.

(21) Appl. No.: 13/501,999

(22) PCT Filed: Oct. 15, 2010

(86) PCT No.: PCT/EP2010/065534
§ 371 (c)(1),
(2), (4) Date: Apr. 13, 2012

(87) PCT Pub. No.: WO2011/045419
PCT Pub. Date: Apr. 21, 2011

(65) Prior Publication Data
US 2012/0204902 A1    Aug. 16, 2012

(30) Foreign Application Priority Data

Oct. 15, 2009  (EP) .................................... 09173203

(51) Int. Cl.
| | | |
|---|---|---|
| *F16H 57/00* | (2012.01) | |
| *F16N 7/16* | (2006.01) | |
| *F16N 7/24* | (2006.01) | |
| *F16N 13/22* | (2006.01) | |
| *B62M 9/16* | (2006.01) | |
| *B62J 31/00* | (2006.01) | |
| *F16N 3/10* | (2006.01) | |

(52) U.S. Cl.
CPC . *B62M 9/16* (2013.01); *B62J 31/00* (2013.01); *F16N 3/10* (2013.01)

(58) Field of Classification Search
CPC ......... B62J 31/00; B27B 17/08; B65G 45/16; F16N 2210/33; F16H 57/05
USPC .................................. 474/92; 184/15.1, 15.2
See application file for complete search history.

(56) References Cited

U.S. PATENT DOCUMENTS

| | | | | | |
|---|---|---|---|---|---|
| 545,972 | A | * | 9/1895 | Polleys | 474/92 |
| 556,733 | A | * | 3/1896 | Byrne | 192/217.1 |
| 574,621 | A | * | 1/1897 | McCulloch et al. | 474/92 |
| 575,520 | A | * | 1/1897 | Grupelli | 474/92 |
| 577,503 | A | * | 2/1897 | Ash | 474/92 |
| 584,238 | A | * | 6/1897 | Reagan | 474/92 |
| 602,000 | A | * | 4/1898 | Fay | 474/92 |
| 603,654 | A | * | 5/1898 | Norris | 144/242.1 |

(Continued)

FOREIGN PATENT DOCUMENTS

| | | |
|---|---|---|
| DE | 94 14 354 U1 | 2/1995 |
| GB | 1909 5215 | 3/1910 |

OTHER PUBLICATIONS

International Search Report and Written Opinion, PCT/EP2010/065534, mailed Nov. 19, 2010.

*Primary Examiner* — Henry Liu
(74) *Attorney, Agent, or Firm* — Winston & Strawn LLP

(57) ABSTRACT

A vehicle sprocket chain maintenance apparatus that includes a brush for cleaning the vehicle sprocket chain and a device for applying lubricant to the vehicle sprocket chain is adapted to be mounted on a vehicle and used on the vehicle sprocket chain while running the vehicle. The vehicle sprocket chain maintenance apparatus includes a mechanism for individual remote control of actuating the brush and the device for applying lubricant on the vehicle sprocket chain while running the vehicle.

20 Claims, 5 Drawing Sheets

(56) References Cited

U.S. PATENT DOCUMENTS

| | | | | |
|---|---|---|---|---|
| 604,429 A * | 5/1898 | Sise | | 474/92 |
| 606,482 A * | 6/1898 | Gallagher | | 15/256.6 |
| 607,014 A * | 7/1898 | Bostwick | | 172/292 |
| 608,609 A * | 8/1898 | Kinnard | | 474/92 |
| 613,833 A * | 11/1898 | Baldwin | | 118/419 |
| 616,593 A * | 12/1898 | Stanbury | | 15/160 |
| 617,224 A * | 1/1899 | Conn | | 15/88.3 |
| 628,087 A * | 7/1899 | Gibford | | 474/92 |
| 635,778 A * | 10/1899 | Hudelson | | 474/92 |
| 648,724 A * | 5/1900 | Cole | | 474/92 |
| 648,866 A * | 5/1900 | Gibford | | 474/92 |
| 1,490,377 A * | 4/1924 | Freeman | | 474/92 |
| 1,600,430 A * | 9/1926 | Schmidt | | 184/28 |
| 1,720,137 A * | 7/1929 | Lunn | | 474/92 |
| 3,229,808 A * | 1/1966 | Olson | | 15/21.1 |
| 3,288,275 A * | 11/1966 | Bunting | | 198/498 |
| 3,612,258 A * | 10/1971 | Bagby | | 198/494 |
| 3,931,991 A * | 1/1976 | Marchello | | 280/295 |
| 4,009,764 A * | 3/1977 | Hafner | | 184/15.2 |
| 4,120,380 A * | 10/1978 | Mann | | 184/15.1 |
| 4,280,591 A * | 7/1981 | Newcomb | | 184/17 |
| 4,578,120 A * | 3/1986 | Chiarella | | 134/9 |
| 4,593,923 A * | 6/1986 | Thalmann | | 280/261 |
| 4,827,555 A * | 5/1989 | Fruit et al. | | 15/160 |
| 4,838,843 A * | 6/1989 | Westhoff | | 474/205 |
| 4,955,850 A * | 9/1990 | Lee | | 474/92 |
| 5,020,637 A * | 6/1991 | Hoenselaar et al. | | 184/15.1 |
| 5,069,470 A * | 12/1991 | Spencer | | 280/288.4 |
| 5,213,180 A * | 5/1993 | Masonek et al. | | 184/15.2 |
| 5,343,588 A * | 9/1994 | Chen | | 15/256.5 |
| 5,372,553 A * | 12/1994 | Simoes et al. | | 474/92 |
| 5,443,139 A * | 8/1995 | Scott | | 184/15.2 |
| 5,484,038 A * | 1/1996 | Rowell | | 184/15.1 |
| 5,595,262 A * | 1/1997 | Martin | | 184/15.2 |
| 5,647,456 A * | 7/1997 | Gelb | | 184/15.2 |
| 5,934,411 A * | 8/1999 | Murano et al. | | 184/11.5 |
| 6,257,369 B1 * | 7/2001 | Pesl | | 184/15.1 |
| 6,695,134 B2 * | 2/2004 | Rubino et al. | | 198/851 |
| 6,942,409 B2 * | 9/2005 | Barbieri | | 401/10 |

\* cited by examiner

VEHICLE SPROCKET CHAIN MAINTENANCE APPARATUS AND A METHOD OF USING THE SPROCKET CHAIN MAINTENANCE APPARATUS

This application is a 371 filing of International Patent Application PCT/EP2010/065534 filed Oct. 15, 2010.

BACKGROUND

A vehicle sprocket chain maintenance apparatus comprising a brush for cleaning the vehicle sprocket chain, said apparatus is adapted to be mounted on a vehicle and used on the vehicle sprocket chain while running the vehicle.

The invention further relates to a method of using the sprocket chain maintenance apparatus according to the invention.

Bicycles are used for transport and sports all over the world. To keep a bike functional it is important that it is regularly seen to and especially that the sprocket chain is cleaned and lubricated. When bicycles are used in competitive sports, as for example mountain bike races or off road challenges, this need becomes even more pronounced and in many cases it is even necessary to clean and lubricate during a race. Usually the bicycle rider must stop and perform the cleaning and lubricating manually before continuing the race. This obviously delays the bicycle athlete and some times the time used in these stops can be crucial of whether a victory is earned or not. Similar problems regarding the constant maintenance of the sprocket chain exists on most sprocket chain driven vehicles, and even though the extent of the problems may vary from vehicle to vehicle depending on type and use the same need to keep the sprocket chain clean and lubricated exists.

Attempts have been made to make maintenance of sprocket chain and gears easier but all of these attempts have severe drawbacks. U.S. Pat. No. 5,343,588 discloses a gear cleaner for cleaning the speed change gear of a bicycle. A brush is mounted by the back wheel of a bike, positioned to be in permanent contact with the gear wheels of the speed change gear. As the brush cleans the gear parts constantly while running the bike the system has the severe drawback that the bristles of the brush are in permanent contact with the gear wheels. This causes a massive wear of the bristles of the brush and also applies a permanent pressure onto the gear wheels inducing a slight slowdown of the forward motion of the bicycle.

U.S. Pat. No. 4,593,923 describes a bicycle sprocket chain cleaner. This device cleans the chain by means of brushes and solvent in a box to be releasably mounted on the bicycle chain. The major drawback of this device is that it cannot be mounted on the bicycle while the bicycle is being run. Furthermore, as detergent is in the device, there is a need to re-lubricate the bicycle chain after using the device.

Thus there is an unmet need for a device for cleaning a vehicle chain without the need for the vehicle rider to stop e.g. during a race.

SUMMARY OF THE INVENTION

In a first aspect according to the present invention is provided an apparatus, which facilitates cleaning the vehicle chain without having to stop the vehicle.

In a second aspect according to the present invention is provided an apparatus, which allows the vehicle rider to maintain his/hers position on the vehicle, remaining seated while cleaning the vehicle chain.

In a third aspect according to the present invention is provided an apparatus, which prevents excessive use of brush bristles.

In a forth aspect according to the present invention is provided an apparatus, which in addition to facilitates cleaning the vehicle chain also facilitates lubricating the vehicle chain without having to stop the vehicle.

The novel and unique way these and further aspects are obtained is by that the vehicle sprocket chain maintenance apparatus comprises first control means for remote control of actuation of the brush while running the vehicle. This way the present invention provides the vehicle rider with the advantage that the rider can clean the sprocket chain while riding the vehicle. The apparatus can be mounted on everything from a bike or scooter for everyday use to an advanced mountain bike for competitive races. In the latter case this is an especially advantage for a rider, as it is possible during a race to save important minutes, as he/she does not have to stop and get of the vehicle to rid the sprocket chain of mud, sand etc. to keep up the maximum capacity of the vehicle.

Vehicles for everyday use are often not sufficiently maintained which creates unnecessary wear on e.g. the bike. This results in that the vehicle becomes less comfortable and harder to ride or even in that the gear or chain malfunctions. If an apparatus as the one here presented is mounted on a vehicle for everyday use, it will help the user to keep a constant high maintenance level of the sprocket chain even during wintertime where salt and water puts a great strain on the movable metal parts on vehicles.

In a preferred embodiment of the present invention the apparatus further comprises a device for applying lubricant to the vehicle sprocket chain and a second control means for remote control of actuating the device for applying lubricant while running the vehicle. In this way the vehicle rider can both clean and lubricate the chain while riding the vehicle, which is especially important with respect to mountain bikes for competitive races because not only is it possible to clean the chain but it is also possible to apply additional lubricant onto the chain while riding the bike.

It is preferred that the first control means and the second control means are individual control means, so that the rider has the possibility of actuating the brush and the device for applying lubricant separately, which allows him to adapt the cleaning and/or lubrication to any given circumstances during a ride on the vehicle.

However, within the scope of the present invention the first and second control means could be activated simultaneously or be a single control means, as this e.g. ensures that lubricant is added continuously to the vehicle sprocket chain while cleaning the chain with the brush.

In a preferred embodiment according to the present invention the first control means comprises at least one first activation button operatively connected to the brush by means of a first wire. Preferably the second control means further comprises at least one second activation button operatively connected to the device for applying lubricant e.g. by means of a second wire. Alternatively the first and/or second wire can be replaced with other actuation means such as e.g. a string or electric actuation means.

In the content of the present invention the term "button" means any activation device, which easily and simply can be active by means of e.g. the fingers of the rider of vehicle.

Thereby a simple way of activating the brush and/or the device for applying lubricant is achieved. It is possible to clean the sprocket chain at strategically appropriate intervals by simply pressing the first activation button for as long as needed. Subsequently or simultaneously the second activation button can be pressed for as long or as many times as it takes to apply a suitable amount of lubricant to the chain.

If the at least one second activation button is connected to the device for applying lubricant by a wire the device may be activated by a pull in the wire generated by pressing the second activation button.

Preferably the at least one first activation button and/or the at least one second activation button are mounted on the vehicles handlebar which makes them easy to reach and use while riding the vehicle without redirecting the vehicle rider's concentration from the track or the traffic. The buttons can be of the type known from hand brakes and gear shifters, i.e. they can be obtained without large costs and the use and function are known and therefore familiar to the user, which helps heighten security. Preferably the first and second button can be positioned close to each other so that the rider can activate them together by e.g. one of his fingers but also activate them individually.

When the brush and device for applying lubricant consists of subunits, which can be replaced independently of each other, it prolongs the lifetime of the vehicle sprocket chain maintenance apparatus as the parts that gets worn first can be exchanged, while the parts in good condition can be kept and thus a constant high efficiency of the apparatus can simply and economically be maintained.

In an advantageous embodiment the brush comprises a brush-hair unit and a brush-fitting unit, and the brush-hair unit is releasably fastened in the brush-fitting unit to allow the replacement of the brush-hair unit. This embodiment allows for easy and fast replacement of the brush-hair unit without having to replace the entire brush. Having the possibility of being able to replace the brush hair unit is an advantage, as the brush-hair unit will get worn faster than the other parts of the brush and the brush-hair unit can therefore preferably be provided as a disposable unit helping to keep the apparatus according to the invention simple and inexpensive.

Similarly the device for applying lubricant can comprise a lubricant applicator, a lubricant container unit and a lubricant device fitting unit, the lubricant applicator and/or the lubricant container unit can preferably be replaceable. As it will be described in more detail later, lubricant is pressed out of the lubricant container and into the lubricant applicator when the second button is activated. This allows the different units of the device for applying lubricant to be replaced at different times if needed. The lubricant container can preferably be pressurized in order to assist in an easy delivering of the lubricant.

The device for applying lubricant is preferably arranged in order to either prevents a negative pressure in the system or alternatively arranged for after application of the lubricant balancing a possible established negative pressure in the lubricant container. This ensures that the device for applying lubricant effectively can apply several dosages of lubricant.

The lubricant container may be fitted in various positions on the vehicle. It may be located close to where the lubricant is to be delivered or it may be close to the second activation button, or it may be placed in any location on the vehicle as long as said location provides that lubricant can be added to the sprocket chain at demand.

If a large (possibly pressurized) lubricant container is used, it may advantageously be mounted on the vehicle frame and e.g. activated via a wire from the second activation button.

If a small lubricant container (e.g. with about 1-2 ml of lubricant) is used it may advantageously be mounted on the handle bar or another place on the vehicle within reach of the rider's hands during use of the vehicle in case the lubricant container needs to be exchanged e.g. if all lubricant is used before use of the vehicle has ended.

The lubricant container, e.g. a small lubricant container, may be connected to the second activation button and/or the remote end of the lubricant applicator by means of one or more hollow tubular members. Said hollow tubular members may be of metal or e.g. flexible tubes of latex, plastic or similar. When the second activation button is activated the lubricant flows through the tubular members and out through the remote end of the lubricant applicator from where it will be applied to the vehicle sprocket chain.

The first wire can advantageously be fitted into a flexible hollow tube (of e.g. latex, plastic or similar material) in order to protect it against wear and tear.

In one embodiment the device for applying lubricant comprises means for controlling the amount of lubricant being applied to the chain each time the second button is activated. In this way a single push on the second button can deliver a predetermined amount of lubricant to the chain. Dependent on e.g. the weather and the type of road on which the vehicle is being driven different amounts of lubricant will be required by the chain per time or per distance traveled. The amount of lubricant being delivered per push of the second button can e.g. be adjusted by having a number of exchangeable second buttons adapted to deliver different amounts of lubricant, or alternatively the adjustment can be obtained by providing the second button with an adjustment device (e.g. a adjusting screw) for adjusting the amount of lubricant being delivered per push.

In a preferred embodiment the device for applying lubricant is arranged to function as a pump in order to facilitate the delivering of the lubricant to the lubricant applicator. This can be achieved by providing the device for applying lubricant with a pumping device activated by the second activation button.

In a preferred embodiment the lubricant applicator extending from the lubricant container (or pumping device) to the brush is a flexible hollow member of e.g. latex, plastic or similar material, and the hollow member can preferably by provided with a clamping device in or to make sure that no lubricant can flow through it when the vehicle sprocket chain maintenance apparatus is not in use.

A compact vehicle sprocket chain maintenance apparatus can be achieved if the lubricant applicator and the brush-hair unit is the same. Sometimes this can be advantageous as to decrease the number of parts, which might need more frequent replacement or to keep weight and complexity of the equipment at a minimum.

In a both economically and environment wise beneficial embodiment the lubricant container unit may be refillable, so that the costs of maintaining the apparatus functional is kept at a minimum as there is no need to buy special equipment every time the lubricant container unit is empty.

The lubricant can be selected from the group comprising colza oil, chain oil, vaseline oil. Both special and advanced oils and cheap oils, which often are environment friendly as e.g. colza oil, can be used. In reality any conventional lubricant can be used as long as it is capable of lubrication the sprocket chain and can be applied via the device for applying lubricant.

Preferably the vehicle is a bicycle. As described earlier, bicycles used in various situations need proper care to function optimally. When the sprocket chain maintenance apparatus according to the present invention is mounted on a bicycle, the advantages of the invention are significant as the maintenance provided, eases the ride and the work to be done by the athlete/rider of the bicycle. As the vehicle is muscle powered, the improved maintenance of the sprocket chain provided by the apparatus according to the present invention is clearly felt by the rider of a bicycle.

Alternatively the vehicle is a motor driven vehicle preferably selected from the group comprising motorbike, scooter, moped, garden tractor or similar. Although these vehicles may have a larger forward propelling power due to the motor, it can still be advantageously to equip them with an apparatus according to the invention to ensure maximum efficiency due to the constant maintenance of the sprocket chain that the present sprocket chain maintenance apparatus provides.

The invention further relates to a method for using the vehicle sprocket chain maintenance apparatus. This method comprises the steps of:
a. providing a vehicle sprocket chain maintenance apparatus according to the invention,
b. running the vehicle, and
c. activating the brush for one or more periods defined by the user of the vehicle for cleaning the vehicle sprocket chain.

By means of this method it is possible to clean the sprocket chain of the vehicle "on the go", which is highly demanded by e.g. mountain bikers, as earlier described, but is also a great possibility to everyday cyclists as it offers the possibility of constantly maintaining essential vehicle parts, which otherwise often are left to rust due to insufficient care.

In order to also being able to lubricate the chain while running the vehicle the method can comprise the further steps of:
d. simultaneously or not simultaneously with step c activating the device for applying lubricant for one or more periods defined by the user of the vehicle, and
e. optionally repeating step c and/or step d.

Preferably the method includes that the brush can be activated by the at least one first activation button, and preferably the device for applying lubricant can be activated by the at least one second activation button. As described earlier the use of buttons, preferably mounted on or near the handlebar, provides easy control of the parts of the apparatus according to the present invention. It helps to heighten the security of the method as the vehicle rider can keep his/hers concentration on steering the bike and constantly being alert on the surroundings, as the first and second button can be chosen and mounted to be easily accessed and operated.

The lifetime of the overall vehicle sprocket chain maintenance apparatus can be prolonged significantly as it is possible to easily replace or refill the parts which are most heavily used if the method further comprises any of the further steps of
f. replacing the brush-hair unit and/or
g. refilling the lubricant container unit.

The vehicle sprocket chain maintenance apparatus according to the invention can easily be mounted on a vehicle by e.g. clips or fixtures. Preferably both the brush and the device for applying lubricant are mounted on the frame and/or on the derailleur by the back wheel of the vehicle. It is possible to mount a vehicle sprocket chain maintenance apparatus according to the present invention on other types of vehicles than the ones mentioned here.

BRIEF DESCRIPTION OF THE DRAWINGS

The invention will now be described with reference to the accompanying drawing in which.

DETAILED DESCRIPTION OF THE INVENTION

The vehicle sprocket chain maintenance apparatus according to the present invention is in the following described by way of example as mounted on a bike. Within the scope of the present invention the apparatus can quite as well be used on other chain driven vehicles.

In the following figures, parts of the bicycle including brakes, chain, gears with derailleur etc. has been left out for illustrative purposes.

Figure 1:
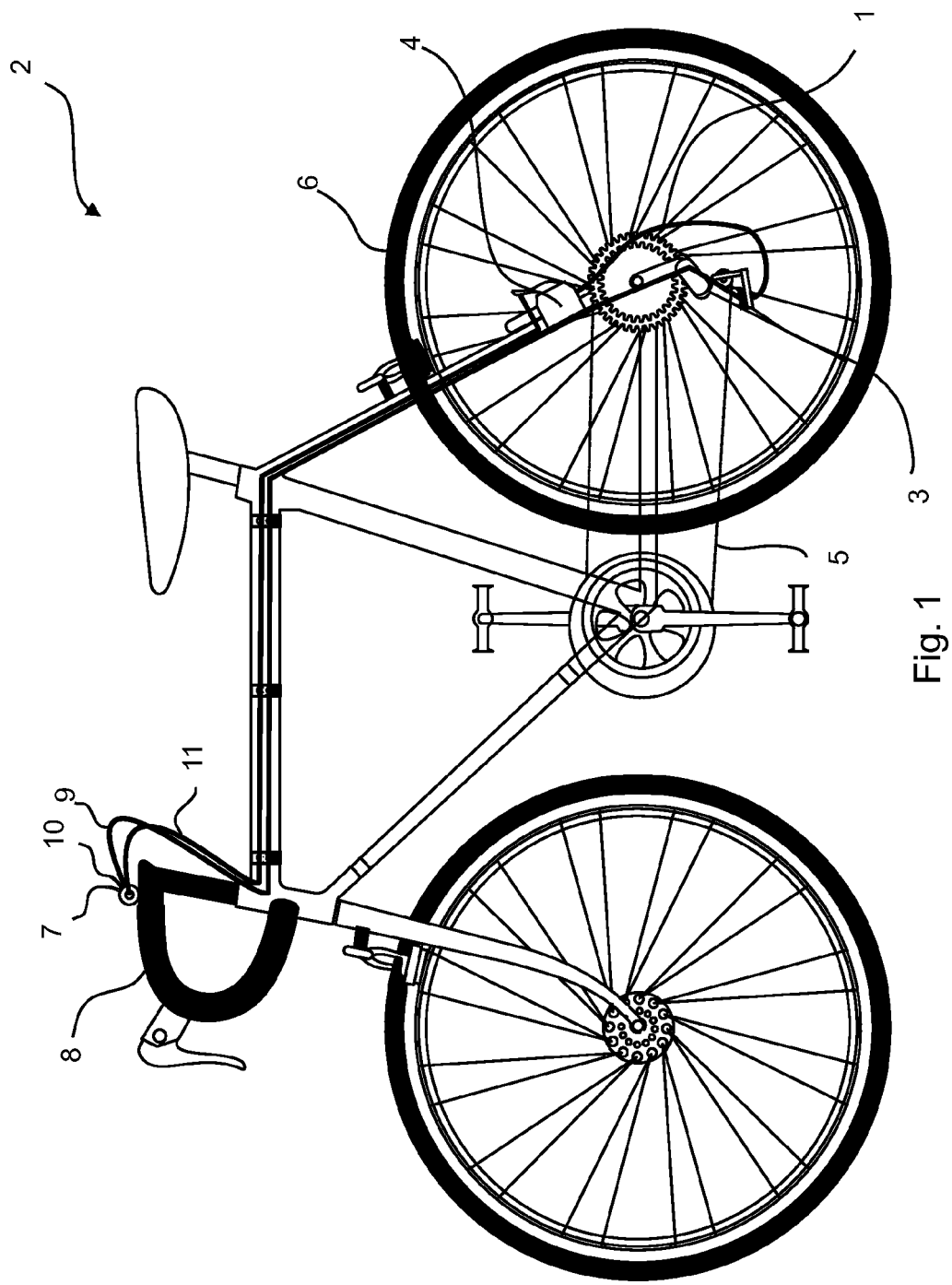
FIG. 1 shows, seen form the side, a bicycle with the bicycle sprocket chain maintenance apparatus.

FIG. 1 shows a bicycle sprocket chain maintenance apparatus 1 according to the present invention mounted on a bicycle 2. The bicycle sprocket chain maintenance apparatus 1 comprises a brush 3 and a device 4 for applying lubricant 25 to the bicycle sprocket chain 5. Both brush 3 and device 4 for applying lubricant 25 are mounted by the back wheel 6 of the bicycle 2. The brush 3 is connected to a first button 7 mounted on the handlebar 8 of the bicycle 2 by a first wire 9. The device 4 for applying lubricant 25 is connected to a second button 10 also mounted on the handlebar 8 by a second wire 11.

The bicycle sprocket chain maintenance apparatus 1 according to the present invention is illustrated on a bicycle with derailleur gear, but it can equally well be mounted on a bicycle, or other vehicle, with another type of gears or with no gears at all.

Figure 2A:
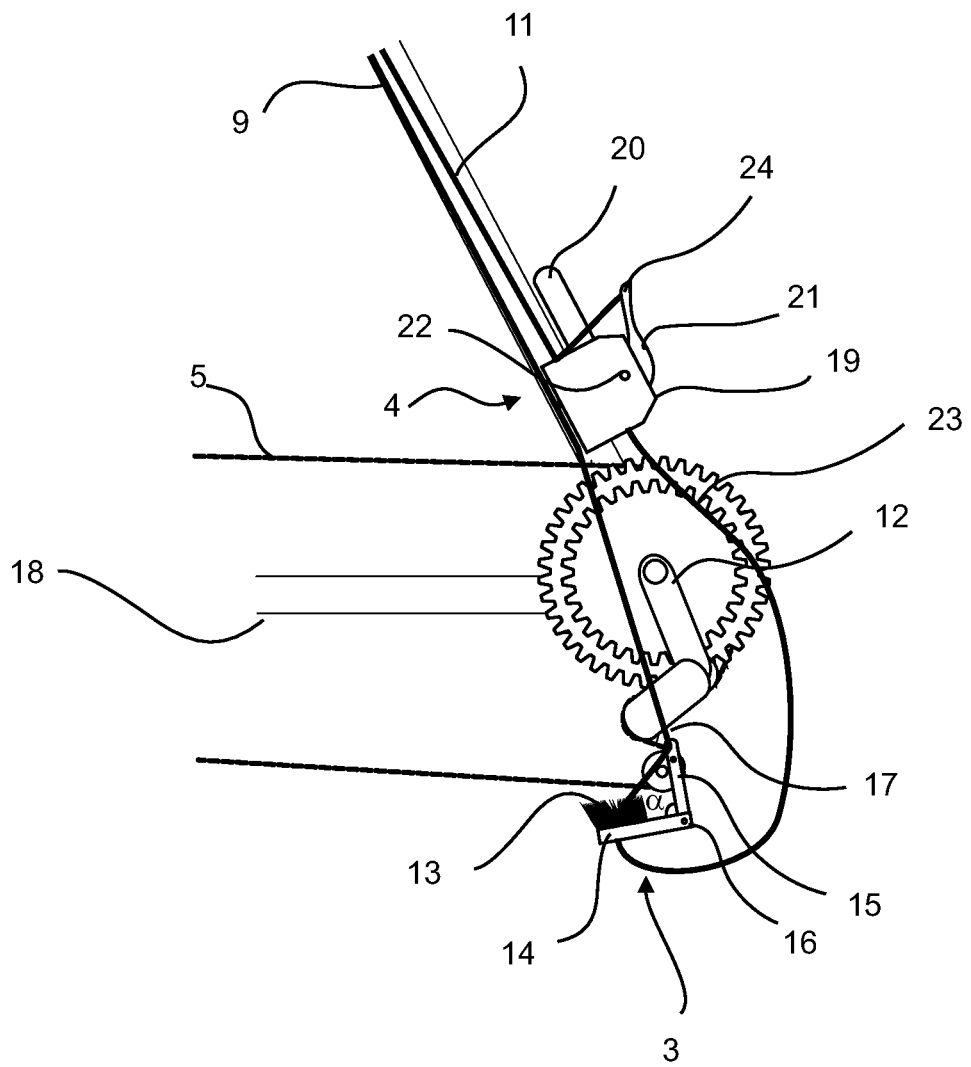
FIGS. 2a and 2b shows in an enlarged scale details of FIG. 1 showing the speed change gear part by the back wheel along with main part of the bicycle sprocket chain maintenance apparatus.
Figure 2B:
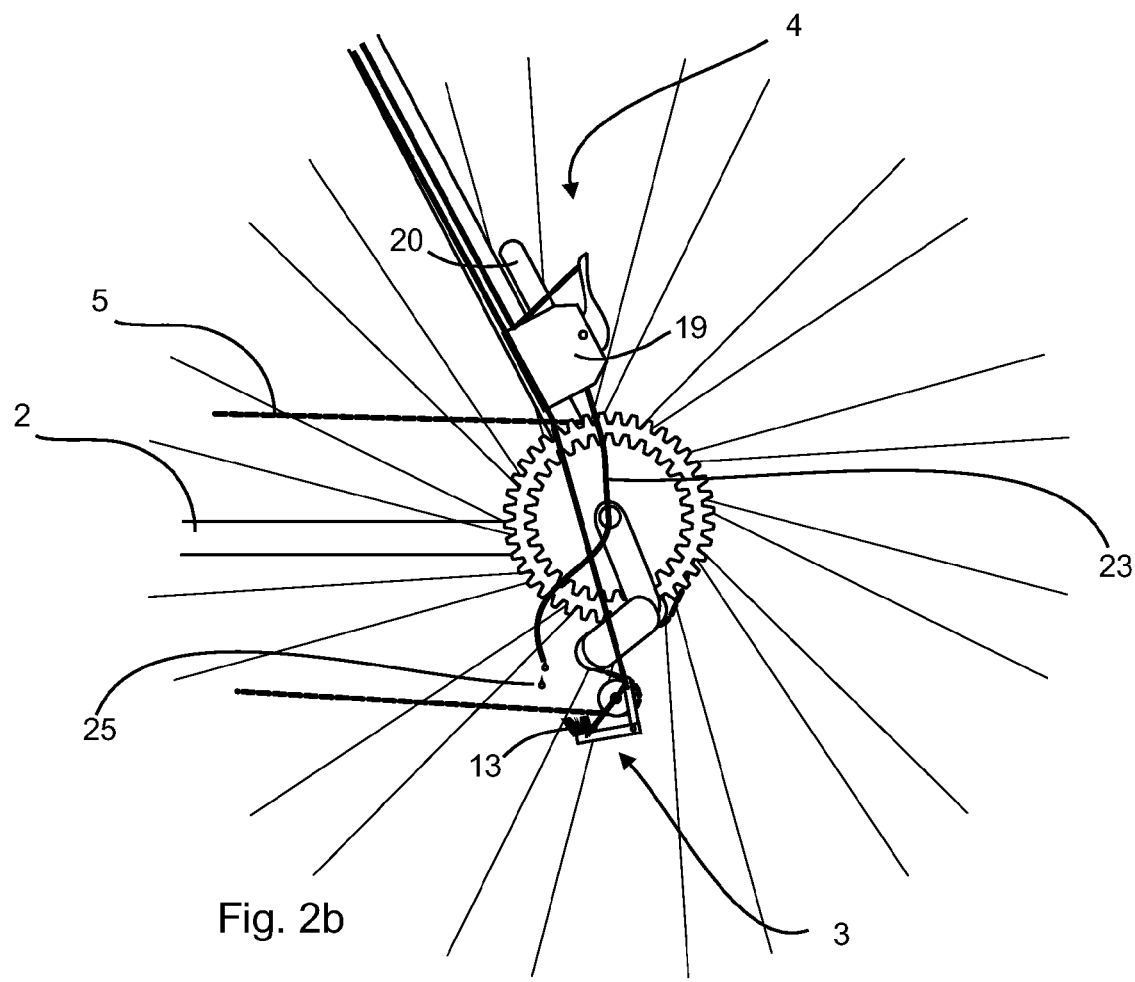

FIGS. 2a and 2b are enlarged scale view of the chain area at the back wheel 6 illustrating the brush 3 and the device 4 for applying lubricant 25 in more detail. The spokes of the wheel has been left out in FIG. 2a for clarity.

In FIG. 2a the brush 3 is located at the derailleur 12, more specifically the brush 3 is mounted at the lower part of the derailleur 12 towards the road surface wherefrom dirt may reach the chain. This position is however only exemplary and may depend e.g. on the local geometry of frame, gear and sprocket chain 5. The brush 3 comprises a brush-hair unit 13 and a brush-fitting unit 14. The brush-fitting unit 14 is mounted on the derailleur 12 and consists of an upper brush-fitting part fastened on the derailleur 12 pivotable arranged with a lower brush fitting part 16. In the present embodiment the angle α between the upper brush-fitting part 15 and the lower brush-fitting part 16 is 90° when the brush 3 is in its resting position i.e. when the brush 3 is not applied to the chain 5. The angle α in the present embodiment is chosen to fit the geometry of the derailleur and sprocket chain. If the apparatus according to the invention is to be mounted in another location on the bicycle or on another type of vehicle the angle α can be another in order to fit e.g. the geometry of the frame and the sprocket chain 5. The first wire 9 is coupled to a first end 17 on the upper brush-fitting part 15 and extends to the lower brush fitting part 16 where it fastened and terminated. This way when the first button 7 (not shown) is activated the first wire 9 is pulled slightly and hereby the lower brush fitting part 16 is pulled up towards the chain 5 in a motion where the angle α is decreased, and the sprocket chain 5 is cleaned by the brush-hair unit 13 for as long as the first button 7 is activated.

The device 4 for applying lubricant 25 is mounted on the bicycle frame 18 above the derailleur 12, seen in the bike's upright position. The device 4 for applying lubricant 25 comprises a lubricant device fitting unit 19 fastened to the frame 18, a lubricant container 20 and a lubricant applicator 23. The lubricant container 20 and an actuator 21 extend from the lubricant device fitting unit 19, and said actuator 21 is operatively connected to the lubricant container 20 and is also connected to the lubricant device fitting unit 19 by means of a pivot hinge 22. The lubricant applicator 23 extends from the lubricant device fitting unit 19, said lubricant applicator 23 being in fluid communication with lubricant container 20. The second wire 11 is coupled to the device 4 for applying lubricant 25 where the lubricant device fitting unit 19 is mounted on the frame 18. From here the second wire 11 extends further towards the tip 24 of the tap 21 where it is fastened. When the second button 10 (not shown) is activated, the second wire 11, and thus the tap 21, is pulled slightly towards the lubricant container 20. Hereby a specified amount of lubricant 25 is pressed out of the lubricant container 20 and into the lubricant applicator 23 and from here it is applied to the chain 5. In the present embodiment the lubricant applicator 23 ends in the brush 13 and thus lubricant 25 can be applied on the sprocket chain 5 when the brush 13 is activated and is pressing against the sprocket chain 5.

In the alternative embodiment seen in FIG. 2b, the lubricant applicator 23 ends just above the sprocket chain 5 at the derailleur 12 allowing lubricant 25 to drip onto the sprocket chain 5 when the second button 10 (not shown) is activated by the person riding the bicycle 2.

Figure 3:
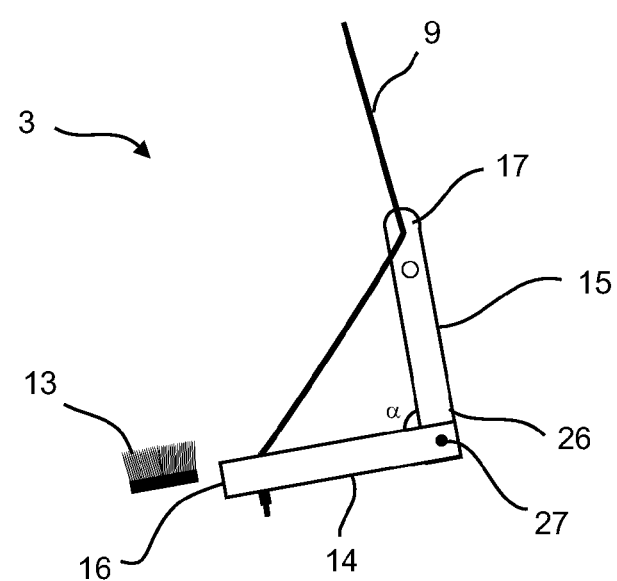
FIG. 3 shows a partly exploded view of the brush with associated brush-hair unit and brush fitting unit.

In FIG. 3 the brush 3 is seen in a partly exploded view. The brush-fitting unit 14 consists of an upper brush-fitting part 15 to be fastened on the derailleur 12 (not shown) and a lower brush fitting part 16. The upper brush-fitting part 15 has a first end 17 opposite a second end 26. The upper brush-fitting part 15 extends into the lower brush fitting part 16 through a pivot joint 27 at the second end 26 of the upper brush-fitting part 15. The brush-hair unit 13 is adapted to be fastened in the lower brush fitting part 16.

In the present embodiment the angle α between the upper brush-fitting part 15 and the lower brush-fitting part 16 is 90° when the brush 3 is in its resting position, i.e. when the brush 3 is not applied to the chain 5. The first wire 9 is coupled to the first end 17 of the upper brush-fitting part 15 and extends to the lower brush fitting part 16 where it is fastened. This way, when the first button 7 (not shown) is activated the first wire 9 is pulled slightly and hereby the lower brush fitting part 16 is pulled up towards the chain 5 in a motion where the angle α is decreased. The brush-hair unit 13 can be mounted in the brush fitting unit 14 by a click system allowing for easily changing the brush hair unit 13 without the use of tools. Alternatively the brush-hair unit 13 can be fastened on the brush fitting unit by one or more screws or similar means.

Figure 4:
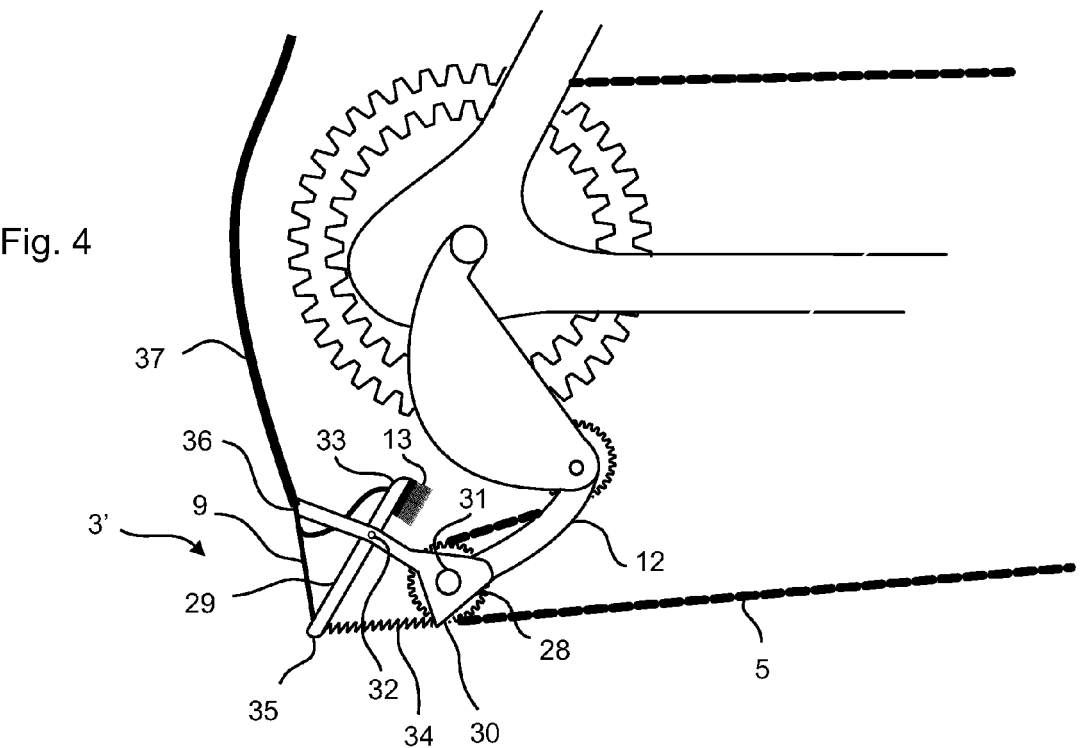
FIGS. 4 and 5 shows the speed change gear part by the back wheel along with the brush in its resting and active position, respectively.
Figure 5:
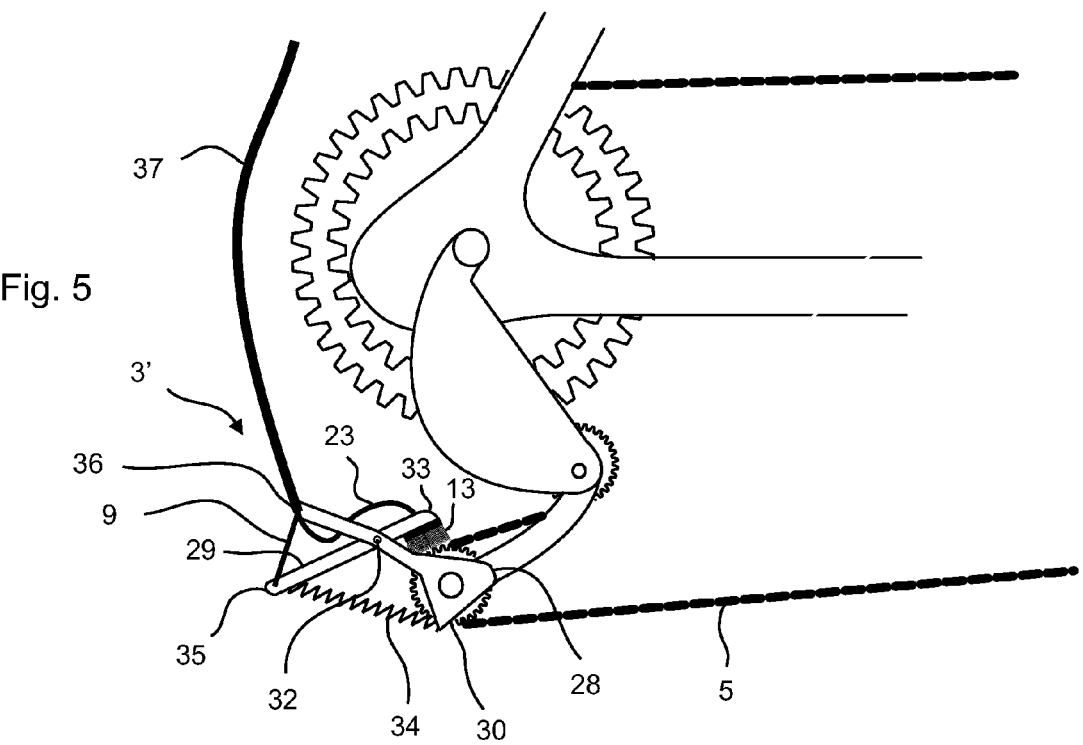

FIGS. 4 and 5 show an alternative arrangement of a brush 3' with a first arm 28 and a second arm 29. The first end 30 of the first arm 28 is detachably attached to the derailleur 12 by means of a screw 31. The second arm 29 is connected with the first arm 28 via a pivot joint 32. A brush-hair unit 13 is releasable fastened at the first end 33 of the second arm 29. A spring 34 is extending between the first end 30 of the first arm 28 and the second end 35 of the second arm 29. The first wire 9 is coupled to the second end 36 of the first arm 28 and extends to the second end 35 of the second arm 29. The lubricant applicator 23 and the first wire 9 (with or without a flexible hollow tube surrounding the first wire 9) is fitted into a flexible hollow tube 37 of e.g. latex, plastic or similar material.

FIG. 4 shows the brush 3' in its resting position and FIG. 5 shows the brush 3' in its activated position. When the brush 3' is activated by the first button 7 (not shown) the wire 9 pulls the second end 35 of the second arm 29 so that the second arm 29 pivots around the pivot joint 32 and the brush-hair unit 13 engages with the chain 5. The spring 34 allows the brush hair unit 13 to return to its inactive position when the user deactivates the second button 10. When the second activation button 10 (not shown) is activated lubricant 25 flows through the lubricant applicator 23 and out into the brush hair unit 13.

Figure 6:
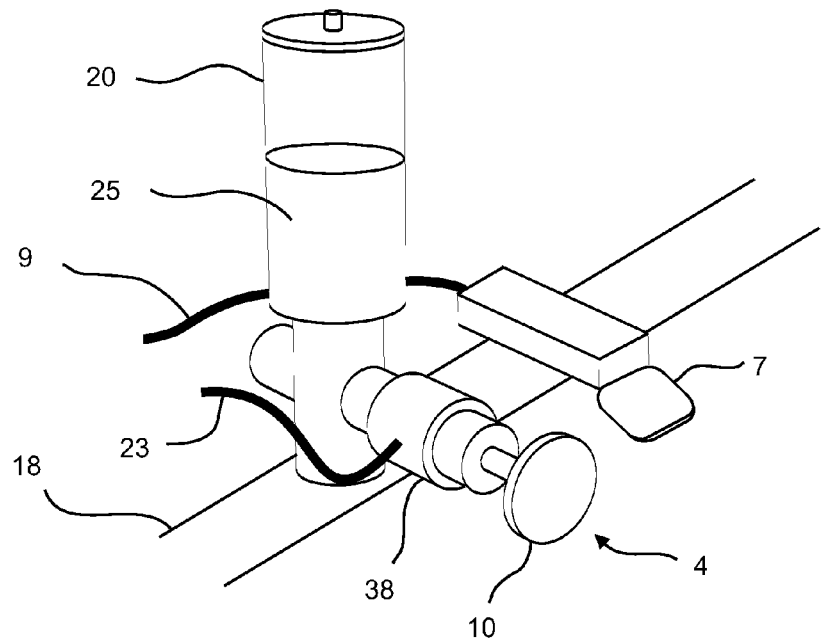
FIG. 6 shows the first and second control means on a handle bar of a vehicle.

FIG. 6 shows a part of the vehicle sprocket chain maintenance apparatus 1 including a pumping device 38. The first wire 9 extends from the first control means in the form of the first activation button 7. The lubricant applicator 23 extends from the second control means in the form of the second button 10. Both control means are preferably arranged on the handle bar together with the pumping device 38 and the lubricant container 20 containing lubricant 25. Upon activation of the pumping device 38 by pressing the second button 10, lubricant 25 flows from the lubricant container 20 to the lubricant application 23 via the pumping device 38.

Figure 7:
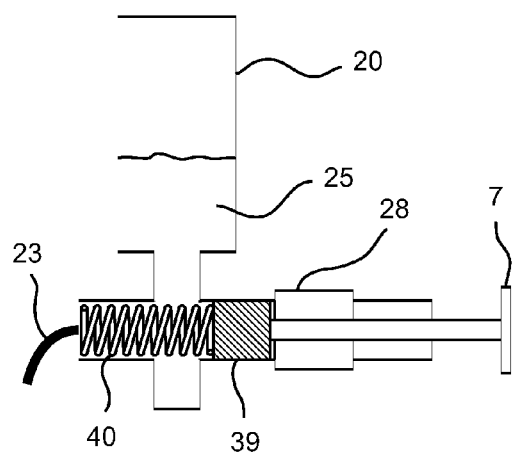
FIGS. 7 and 8 show the first control means, lubricant container and pumping device with the pumping device in its resting position and activate second position, respectively.
Figure 8:
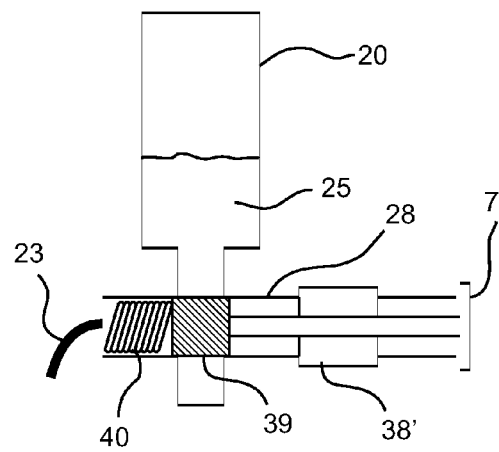

In FIGS. 7 and 8 is shown a different embodiment of the pumping device 38' shown in FIG. 6, where the lubricant applicator 23 23 is placed as a continuation of a piston 39. Said piston can move between a first resting position and a second activated position. A spring 40 ensures that the piston 39 returns to its first position when the second button 10 is not activated. Activation of the second button 10 actuates the remote delivery of lubricant 25 to the brush-hair unit 13 (shown in FIGS. 4 and 5).

As indicated in FIGS. 7 and 8 it is preferred that the piston 39 blocks the fluid connection between the lubricant container and the pumping device 38 when the pumping device 38 is activated. This ensures that only a single dosage of lubricant is added via the applicator 23 to the brush-hair unit 13.

In order to ensure that a possible negative pressure in the pumping device is balanced after delivery of said dosage of lubricant, the device is arranged such that air can flow from the surroundings and into the lubricant container 20 via the lubricant applicator 23. In this way gravity can also assist in delivering the dosage of lubricant.

Other ways of ensuring that a negative pressure is not present in the device will be evident for the person skilled in the art. E,g. can the device 4 for applying lubricant 25 In an alternative embodiment be provided with a one-way valve (not shown), which allows flow of air from the surrounding into the lubricant container 20 while the piston 39 is moving back to its resting position.

Thus the vehicle sprocket chain maintenance apparatus provides a unique possibility for cleaning and maintaining a sprocket chain on a vehicle with a minimum of effort and use of time while the vehicle is running and the rider is underway to his/hers destination.

What is claimed is:

1. A vehicle sprocket chain maintenance apparatus comprising a brush for cleaning the vehicle sprocket chain and a device for applying lubricant to the vehicle sprocket chain, wherein the apparatus is adapted to be mounted on a vehicle and used on the vehicle sprocket chain while running the vehicle, with the vehicle sprocket chain maintenance apparatus further comprising a mechanism for individual remote control of actuating either the brush or the device for applying lubricant on the vehicle sprocket chain or both while running the vehicle; wherein the remote control mechanism comprises at least one first activation button operatively connected to the brush, and at least one second activation button operatively connected to the device for applying lubricant.

2. The vehicle sprocket chain maintenance apparatus according to claim 1, wherein the at least one first activation button is operatively connected by a first wire, a string or electric actuation mechanism to the brush, and the at least one second activation button is operatively connected by a second wire, a string or electric actuation mechanism to the device for applying lubricant.

3. The vehicle sprocket chain maintenance apparatus according to claim 1, wherein the vehicle is a bicycle and wherein the at least one first activation button and the at least one second activation button are mounted on the vehicle's handlebar.

4. The vehicle sprocket chain maintenance apparatus according to claim 1, wherein the brush comprises a brush-hair unit and a brush fitting unit, with the brush-hair unit releasably fastened in the brush fitting unit to allow the replacement of the brush-hair unit.

5. The vehicle sprocket chain maintenance apparatus according to claim 1, wherein the device for applying lubricant comprises a lubricant applicator, a lubricant container unit and a lubricant device fitting unit, and the lubricant applicator or the lubricant container unit is replaceable.

6. The vehicle sprocket chain maintenance apparatus according to claim 1, wherein the device for applying lubricant comprises a mechanism for controlling the amount of lubricant being applied to the chain each time the remote control mechanism is activated.

7. The vehicle sprocket chain maintenance apparatus according to claim 1, wherein the device for applying lubricant comprises a pumping device, where the pumping device is activated by the remote control mechanism.

8. The vehicle sprocket chain maintenance apparatus according to claim 1, wherein the brush comprises a brush-hair unit and a brush fitting unit, with the brush-hair unit releasably fastened in the brush fitting unit to allow the replacement of the brush-hair unit, wherein the device for applying lubricant comprises a lubricant applicator, a lubricant container unit and a lubricant device fitting unit, and the lubricant applicator or the lubricant container unit is replaceable, and wherein the lubricant applicator and the brush-hair unit is the same part.

9. The vehicle sprocket chain maintenance apparatus according to claim 5, wherein the lubricant container unit is refillable or pressurized.

10. The vehicle sprocket chain maintenance apparatus according to claim 5, wherein the device for applying lubricant is preferably arranged in order to either prevent a negative pressure in the system or alternatively arranged for after application of the lubricant balancing a possible established negative pressure in the lubricant container unit.

11. The vehicle sprocket chain maintenance apparatus according to claim 7, wherein a possible negative pressure in the pumping device is balanced after delivery of a dosage of lubricant by arranging the device so that air can flow from the surroundings and into the lubricant container via the lubricant applicator.

12. The vehicle sprocket chain maintenance apparatus according to claim 7, wherein the pumping device is provided with a piston movable between a first resting position and a second activated position, and the device for applying lubricant is provided with a one-way valve, which allows flow of air from the surrounding into the lubricant container while the piston is moving back to its resting position.

13. A bicycle with the vehicle sprocket chain maintenance apparatus according to claim 1.

14. A vehicle sprocket chain maintenance apparatus comprising a brush for cleaning the vehicle sprocket chain and a device for applying lubricant to the vehicle sprocket chain, wherein the apparatus is adapted to be mounted on a vehicle and used on the vehicle sprocket chain while running the vehicle, with the vehicle sprocket chain maintenance apparatus further comprising a mechanism for individual remote control of actuating either the brush or the device for applying lubricant on the vehicle sprocket chain or both while running the vehicle, wherein the device for applying lubricant comprises a mechanism for controlling the amount of lubricant being applied to the chain each time the remote control mechanism is activated, and wherein the lubricant controlling mechanism comprises a number of exchangeable activation buttons adapted to deliver different amounts of lubricant, or an adjustment device provided on an activation button for adjusting the amount of lubricant being delivered per push of the activation button.

15. The vehicle sprocket chain maintenance apparatus according to claim 14, wherein the vehicle is a bicycle.

16. A bicycle with the vehicle sprocket chain maintenance apparatus according to claim 14.

17. A vehicle sprocket chain maintenance apparatus for a bicycle or other vehicle that includes a sprocket chain, the apparatus comprising a brush for cleaning the sprocket chain, or a device for applying lubricant oil to the sprocket chain, or both the brush and the device for applying lubricant oil; and a mechanism for individual remote control of independently actuating either the brush or the device for applying lubricant oil, or simultaneously activating both the brush and the device for applying lubricant oil, with the individual remote control mechanism being operable while running the vehicle; wherein the brush is activated by at least one first activation button, the device for applying lubricant oil is activated by at least one second activation button, or the brush and the device for applying lubricant oil are each activated by their respective activation button(s); and further wherein the brush is applied to the chain as long as the at least one first activation button is depressed while lubricant oil is applied to the chain as long as the at least one second activation button is depressed.

18. A bicycle with the vehicle sprocket chain maintenance apparatus according to claim 17.

19. A method for maintaining a vehicle sprocket chain, which comprises providing, on a bicycle or other vehicle that includes a sprocket chain, a sprocket chain maintenance apparatus according to claim 17 so that the brush or the device for applying lubricant oil, or both the brush and device for applying lubricant oil can be activated by its respective activation button(s) while running the vehicle.

20. The method for maintaining a vehicle sprocket chain according to claim 19, wherein the brush comprises a brush-hair unit and a brush fitting unit and the device for applying lubricant oil comprises a lubricant applicator, a lubricant container unit and a lubricant device fitting unit, and the method further comprises:
releasably fastening the brush-hair unit in the brush fitting unit to facilitate replacement of the brush-hair unit; and
releasably fastening the lubricant applicator or the lubricant container unit to facilitate replacement thereof or refilling of the lubricant container unit.

* * * * *